(12) United States Patent
Staunton-Lambert

(10) Patent No.: US 11,146,473 B2
(45) Date of Patent: *Oct. 12, 2021

(54) MEASURING RESPONSE TRENDS IN A DIGITAL TELEVISION NETWORK

(71) Applicant: OpenTV, Inc., San Francisco, CA (US)

(72) Inventor: Kevin Staunton-Lambert, Pyrmont (AU)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,757

(22) Filed: Jan. 6, 2020

(65) Prior Publication Data

US 2020/0236029 A1 Jul. 23, 2020

Related U.S. Application Data

(63) Continuation of application No. 16/044,034, filed on Jul. 24, 2018, now Pat. No. 10,581,714, which is a (Continued)

(51) Int. Cl.
*H04L 12/26* (2006.01)
*H04L 12/24* (2006.01)

(52) U.S. Cl.
CPC .......... *H04L 43/12* (2013.01); *H04L 41/5009* (2013.01); *H04L 41/509* (2013.01); *H04L 43/0817* (2013.01)

(58) Field of Classification Search
CPC ..... H04L 41/00; H04L 41/06; H04L 41/0631; H04L 41/08; H04L 41/0813; H04L 41/0816; H04L 41/085–0859; G06F 11/00; G06F 11/30; G06F 11/32; G06F 11/327; G06F 11/34; G06F 11/3438; G06F 11/3452; G06F 15/00; G06F 15/16; G06Q 10/00; G06Q 10/04; G06Q 10/08; G06Q 10/087; G06Q 20/00; G06Q 20/22;
(Continued)

(56) References Cited

U.S. PATENT DOCUMENTS 6,085,193 A  7/2000 Malkin et al.
6,477,575 B1  11/2002 Koeppel et al.
(Continued)

FOREIGN PATENT DOCUMENTS

CN  1662901  8/2005
CN  102591321  7/2012
(Continued)

OTHER PUBLICATIONS

International Search Report issued in PCT/US2014/048290 dated Nov. 14, 2014.
(Continued)

*Primary Examiner* — Tauqir Hussain
(74) *Attorney, Agent, or Firm* — Polsinelli LLP

(57) ABSTRACT

Techniques and systems for providing a trend server outside a content provider network to communicate with the content provider network to build a trend record based on responses received from the content provider network for monitoring certain activity trend or tendency in the content provider network and provide an alert when the content provider network behaves abnormally.

20 Claims, 15 Drawing Sheets

Related U.S. Application Data continuation of application No. 13/952,471, filed on Jul. 26, 2013, now Pat. No. 10,063,450.

(58) Field of Classification Search
CPC ......... G06Q 30/00; G06Q 30/02–0203; G06Q 30/0206; G06Q 30/0222; G06Q 30/0224; G06Q 30/0239; G06Q 30/0241; G06Q 30/0251; G06Q 30/0253; G06Q 30/0254; G06Q 30/0257; G06Q 30/0263; G06Q 30/0283
USPC ......................................................... 709/224
See application file for complete search history.

(56) References Cited

U.S. PATENT DOCUMENTS

| | | |
|---|---|---|
| 6,487,538 B1 | 11/2002 | Gupta et al. |
| 6,505,248 B1 | 1/2003 | Casper et al. |
| 7,023,979 B1 | 4/2006 | Wu et al. |
| 7,222,185 B1 | 5/2007 | Day |
| 7,318,036 B2 | 1/2008 | Kim et al. |
| 7,379,879 B1 | 5/2008 | Sloo |
| 7,584,353 B2 | 9/2009 | Risan et al. |
| 7,668,823 B2 | 2/2010 | Oldham et al. |
| 7,720,715 B1 | 5/2010 | Nemer |
| 7,765,481 B2 | 7/2010 | Dixon et al. |
| 7,873,708 B2 | 1/2011 | Durand et al. |
| 7,895,227 B1 | 2/2011 | Henderson |
| 7,949,724 B1 | 5/2011 | Schachter |
| 7,953,850 B2* | 5/2011 | Mani ................... H04L 67/125 709/224 |
| 7,991,770 B2 | 8/2011 | Covell et al. |
| 8,140,672 B2 | 3/2012 | Crowder et al. |
| 8,185,431 B2 | 5/2012 | Abboa-Offei |
| 8,307,392 B2 | 11/2012 | Ahanger et al. |
| 8,364,669 B1 | 1/2013 | Chowdhury et al. |
| 8,386,601 B1 | 2/2013 | Sutter et al. |
| 8,429,265 B2 | 4/2013 | Baumback et al. |
| 8,509,266 B2 | 8/2013 | Borkovsky et al. |
| 8,510,807 B1 | 8/2013 | Elazary et al. |
| 8,543,868 B2* | 9/2013 | Gyorffy ............. H04L 43/0876 714/47.2 |
| 8,566,726 B2 | 10/2013 | Dixon |
| 8,583,786 B2 | 11/2013 | Swamidas et al. |
| 8,612,291 B2 | 12/2013 | Huang et al. |
| 8,639,767 B1 | 1/2014 | Harris |
| 8,645,190 B1 | 2/2014 | Juda et al. |
| 8,655,873 B2 | 2/2014 | Mitchell et al. |
| 8,667,127 B2* | 3/2014 | Bettis ..................... G06T 7/90 709/224 |
| 8,671,158 B2 | 3/2014 | Vignisson et al. |
| 8,694,016 B2 | 4/2014 | Ahuja et al. |
| 8,725,716 B1 | 5/2014 | Riley et al. |
| 8,762,195 B1 | 6/2014 | Martin et al. |
| 8,775,924 B1 | 7/2014 | Bilinski |
| 8,806,045 B2 | 8/2014 | Turner et al. |
| 8,856,146 B2 | 10/2014 | Dempski et al. |
| 8,856,545 B2 | 10/2014 | Banerjee et al. |
| 8,935,245 B1 | 1/2015 | Cionca et al. |
| 9,055,295 B2 | 6/2015 | Woerndle |
| 9,077,675 B2 | 7/2015 | Harris |
| 9,501,849 B2* | 11/2016 | Wong ................... G06T 11/206 |
| 9,893,963 B2* | 2/2018 | Bansal ................... H04L 43/16 |
| 10,296,410 B2* | 5/2019 | Dunne ............... G06F 11/0793 |
| 10,581,714 B2 | 3/2020 | Staunton-Lambert |
| 10,599,545 B2* | 3/2020 | Ko ...................... G06F 11/3452 |
| 2002/0087389 A1 | 7/2002 | Sklarz et al. |
| 2002/0111920 A1 | 8/2002 | Tresser |
| 2003/0065986 A1* | 4/2003 | Fraenkel ............. G06F 11/3089 714/47.2 |
| 2004/0128184 A1 | 7/2004 | Bracken |
| 2005/0086526 A1 | 4/2005 | Aguirre |
| 2005/0177401 A1 | 8/2005 | Koeppel et al. |
| 2006/0025931 A1 | 2/2006 | Rosen |
| 2007/0244724 A1 | 10/2007 | Pendergast |
| 2008/0039111 A1 | 2/2008 | Ahuja et al. |
| 2008/0228574 A1 | 9/2008 | Stewart et al. |
| 2009/0138565 A1* | 5/2009 | Shift ...................... G06Q 30/02 709/206 |
| 2009/0254392 A1 | 10/2009 | Zander |
| 2009/0265704 A1 | 10/2009 | Branda et al. |
| 2010/0122120 A1 | 5/2010 | Lin |
| 2011/0078302 A1 | 3/2011 | Dehaan et al. |
| 2011/0109643 A1 | 5/2011 | Bettis et al. |
| 2011/0113086 A1 | 5/2011 | Long |
| 2011/0161402 A1 | 6/2011 | Anderson et al. |
| 2011/0185235 A1 | 7/2011 | Iizuka |
| 2011/0282939 A1 | 11/2011 | Golla et al. |
| 2011/0320715 A1 | 12/2011 | Ickman et al. |
| 2012/0017281 A1 | 1/2012 | Banerjee |
| 2012/0101952 A1 | 4/2012 | Raleigh et al. |
| 2012/0151068 A1 | 6/2012 | Su et al. |
| 2012/0158461 A1 | 6/2012 | Aldrey et al. |
| 2012/0158713 A1 | 6/2012 | Jin et al. |
| 2012/0221566 A1 | 8/2012 | Iwasa et al. |
| 2012/0271829 A1 | 10/2012 | Jason |
| 2012/0284738 A1 | 11/2012 | Narasimhan et al. |
| 2012/0316916 A1 | 12/2012 | Andrews et al. |
| 2013/0074109 A1 | 3/2013 | Skelton |
| 2013/0110631 A1 | 5/2013 | Mitchell et al. |
| 2013/0204961 A1 | 8/2013 | Fliam et al. |
| 2013/0267209 A1 | 10/2013 | Bott |
| 2013/0268656 A1 | 10/2013 | Bott |
| 2014/0006406 A1 | 1/2014 | Kafati |
| 2014/0025841 A1 | 1/2014 | Li et al. |
| 2014/0108118 A1 | 4/2014 | Li |
| 2014/0149533 A1 | 5/2014 | Bergman et al. |
| 2014/0180826 A1 | 6/2014 | Boal |
| 2014/0244778 A1 | 8/2014 | Wyatt et al. |
| 2014/0282705 A1 | 9/2014 | Chatterjee et al. |
| 2015/0012555 A1 | 1/2015 | Ishiguro et al. |

FOREIGN PATENT DOCUMENTS

| | | |
|---|---|---|
| CN | 103038652 | 4/2013 |
| WO | WO2009076187 | 6/2009 |

OTHER PUBLICATIONS

Written Opinion issued in PCT/US2014/048290 dated Nov. 14, 2014.
Written Opinion issued in Singapore Application No. 11201600602Y dated Oct. 4, 2016.
European Search Report issued in Application No. EP 14 83 0008 dated Dec. 8, 2016.
Written Opinion issued in Singapore Application No. 11201600602Y dated May 19, 2017.
Non-Final Office Action of Jun. 27, 2019 for U.S. Appl. No. 16/044,034; 10 pages.
Notice of Allowance for U.S. Appl. No. 16/044,034; 5 pages.

* cited by examiner

```
Object {requestId: 1310632497, result: Array[16], resultCode: "0", token: null}
1.    requestId: 1310632497
2.    result: Array[16]
 1.     0: Object
 2.     1: Object
 3.     2: Object
 4.     3: Object
 5.     4: Object
  1.     editorialAsset: Object
   1.     actors: "Frank Oz;Ian
   2.                 McDiarmid;Ewan McGregor;Natalie Portman;Hayden
   3.                 Christensen"
   4.     aspectRatio: null
   5.     assetList: null
   6.     assetOrder: null
   7.     assetPlayType: "E"
   8.     assetType: "VE"
   9.     audioMode: null
  10.     audioPid: Array[0]
  11.     audioSubtracks: null
  12.     bestSalesIndex: 100
  13.     casDescriptor: null
  14.     casId: null
  15.     changeLog: null
  16.     contentType: null
  17.     copyProtections: null
  18.     copyright: null
  19.     countries: "GB;US"
  20.     creationDate: 1342099530000
  21.     cuBroadcastChannelName: null
  22.     cuBroadcastEndDate: null
  23.     cuBroadcastStartDate: null
  24.     definition: "HD"
  25.     description: "Anakin Skywalker shares a forbidden romance
  26.                  with Padmé Amidala while his teacher, Obi-Wan Kenobi,
  27.                  makes an investigation of a separatist assassination
  28.                  attempt on Padmé which leads to the discovery of a
  29.                  secret Republican clone army. "
  30.     directors: "George Lucas"
  31.     dualMono: "false"
  32.     duration: 30
  33.     durationMillis: 1800000
  34.     encoding: null
  35.     exportID: null
  36.     fileName: null
  37.     fileSize: null
  38.     genre: "Action;Adventure;ScienceFiction"
```

[Global Trending Servers]

Then parses the response to create a representation of the web resource response to include meta-data with respect to previous history in the trending record.

Object {requestId: 1310632497, result: Array[16], resultCode: "0", token: null, trendingServer:"Nagra San Francisco"} actors: "Frank Oz;Ian McDiarmid;Ewan McGregor;Natalie Portman;Hayden Christensen"

actors_trend: Normal, unchanged

930 → Object {requestId: 1310632497, result: Array[16], resultCode: "0", token: null, trendingServer:"Nagra Chesaux"} actors: "Frank Oz;Ian McDiarmid;Ewan McGregor;Natalie Portman;Hayden Christensen"

actors_trend: Normal, unchanged

931 → Object {requestId: 1310632497, result: Array[16], resultCode: "0", token: null, trendingServer:"Nagra Sydney"} actors: "Pwned Oz;Ian McDiarmid;Ewan McGregor;Natalie Portman;Hayden Christensen"

actors_trend: Unexpected, normally "Frank Oz;Ian McDiarmid;Ewan McGregor;Natalie Portman;Hayden Christensen"

FIG. 12

```
<html>
<head>
<meta nagracybermonotiring_alarm="normal here, but changes elsewhere" />
<title>Nagra press releases</title>
</head>
<body>
    Lots of interesting stuff going on...
</body>
</html>
```

```
<html>
<head>
  <title>Anonymous woz ere</title>
  <meta nagracybermonotiring_alarm="modified unexpected" />
  <meta nagracybermonotiring_verbose="title changed when it never has before" />
  <meta nagracybermonotiring_verbose="body changed by more than 50% within 2 days, usually 2% once per day" />
</head>
<body>
  Nagra totally pwned
</body>
</html>
```

1. editorialAsset: Object
1. actors: [normal unchanged value]
...
2. copyProtections: clear-to-air [modified unexpected was null]
3. ...
4. countries: "GB;US;AUS" [modified unexpected AUS has been added]
5. creationDate: [normal unchanged value]
   ...
1. description: "Anakin Skywalker is a complete
2.     idiot, why are you even bothering, go here for something else
3.     instead." [modified unexpected]
4. directors: "Mr. Hacker" [modified unexpected change]
5. dualMono: [normal unchanged value]
6.
...
7. modifiedDate: 1371096438000 13 June 2013 [modified unexpected was 1343175423000 (25 July 2012)]
8. ...
9. nPVR: "true" [modified unexpected was previously "false"]

10. name: "Star Wars II
11.     : Attack Of The Clones"
    ...
1. recordable: "true" [modified unexpected was previously "false"]

FIG. 15

MEASURING RESPONSE TRENDS IN A DIGITAL TELEVISION NETWORK

CROSS REFERENCE TO RELATED APPLICATIONS

This application is a continuation of U.S. patent application Ser. No. 16/044,034, filed Jul. 24, 2018, which is a continuation of U.S. patent application Ser. No. 13/952,471, filed Jul. 26, 2013. The subject matter of all of the foregoing patent applications is incorporated herein by reference in its entirety, for all purposes.

BACKGROUND

This document relates to digital content networks, including monitoring a content network based on message trends.

With the advent of connectivity technologies such as the World Wide Web, multimedia content is ubiquitously present and accessible from practically any location where a user can be. To meet the increasing user demands, content service providers have deployed networks that have steadily increased in size and complexity. Being able to provide content that a user wants at the time and location the user wants it, and be able to bill the user correctly can provide competitive advantage to content service providers.

Better techniques for monitoring operation of a content network for any irregularities are desirable.

SUMMARY

Techniques and systems for providing a trend server outside a content provider network to communicate with the content provider network to build a trend record based on responses received from the content provider network for monitoring certain activity trend or tendency in the content provider network and provide an alert when the content provider network behaves abnormally.

In one disclosed aspect, a method of monitoring status of a content provider network is provided. The method may be implemented by a trending server and includes sending a first request message to the content provider network, where the first request message has an associated type value, receiving a first response message from the content provider network, determining whether or not the first response message is normal by comparing with a trend record for the type value associated with the first request message, selectively updating the trend record based on the first response message and generating an alert when it is determined that the first response message is abnormal.

In another aspect, an apparatus for monitoring operation of a content provider's network is disclosed. The apparatus includes a status response reception module that receives status responses from the content provider's network, a response sorting module that assigns, for every received status response, a corresponding request type based on a status request for which the status response was received, a trending record-keeping module that maintains trend records based on a predetermined number of prior status responses received for each request type, a trending estimation module that estimates a trend for each request type based on the status response and a user setting for that request type, a trend checker module that checks, for each received status response, whether or not the received status response is within the trend for the corresponding request type, and a trend alert module that issues an alert when the received status response is not within the trend for the corresponding request type.

In yet another aspect, a computer program product comprising a computer-readable storage medium having code stored thereupon is disclosed. The code, when executed by a processor, causes the processor to implement a method of monitoring operation of a content provider's network. The method includes receiving a first message from the content provider's network, determining whether the first message is normal by comparing with a trend of previously received messages having a same message type as the first message, selectively updating, based on the first message, the trend for the message type of the first message, and generating an alert when the first message is determined to be not normal.

In a further aspect, a system for monitoring operation of a web service provider is disclosed. The system includes one or more web servers under management of the web service provider, the one or more web servers located inside the web service provider's network and a plurality of monitoring servers positioned external to the web service provider's network and geographically separated from each other. Each monitoring server is configured to transmit sync messages to the one or more web servers, maintain a record of expected responses to the sync messages, receive a status response messages from the one or more web servers, and issue an alert, when the status response message is not an expected response.

These, and other, aspects are further described below with reference to the drawings.

BRIEF DESCRIPTION OF THE DRAWINGS

FIG. 10 depicts an example of a web page monitored by a trending server.

FIGS. 11, 12, 13, 14 and 15 depict examples of contents of messages communicated in a trending server based monitoring system.

Like reference symbols in the various drawings indicate like elements.

DETAILED DESCRIPTION

Figure 1:
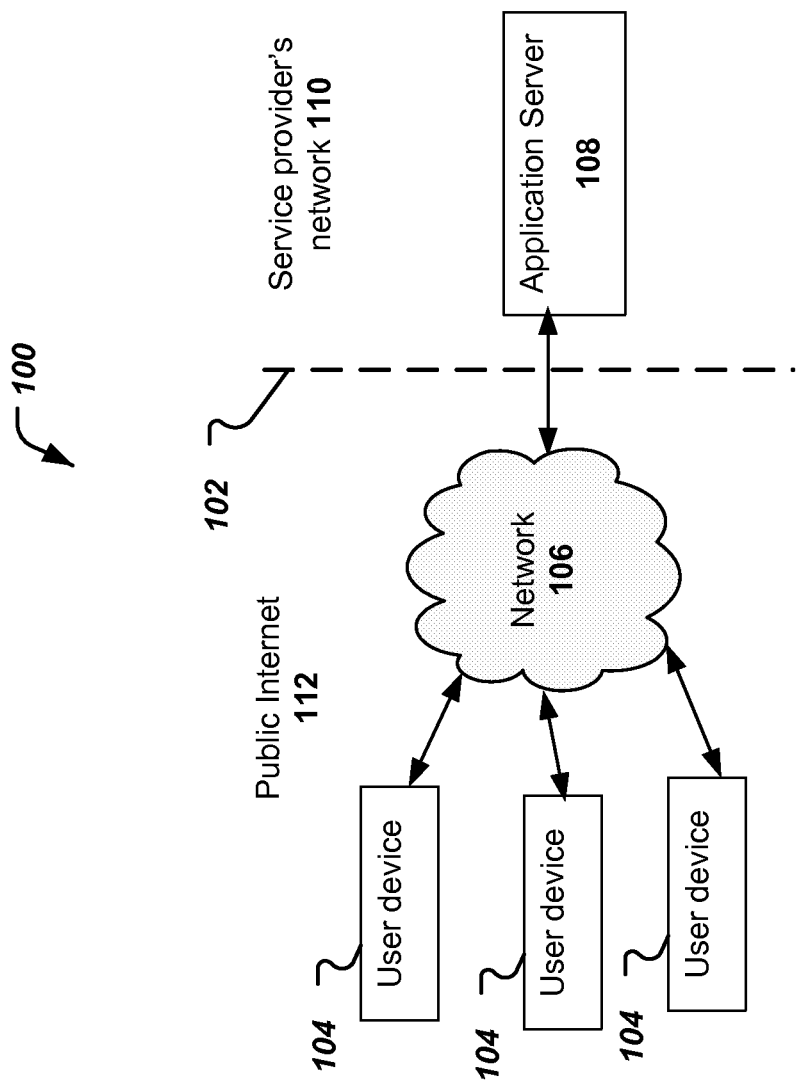
FIG. 1 depicts an example of a content network configuration.

With ever-increasing availability of devices that a user can use to receive and view content, the complexity of content services provider systems is steadily going up. Today, users can access content over several networks, e.g., wired Internet (cable modem or high speed phone), wireless networks (e.g., 3G/4G cellular networks, 802.11 local area networks, and so on), fiber networks (e.g., AT&T U-verse or Verizon FiOS), digital cable delivery services, and so on.

To stay competitive, content providers today often carry thousands of movie, audio and television program titles in their inventory and make these available to users (subscribers or non-subscribers) either free or using some fee structure such as per-usage or subscription-based access. Furthermore, user requests may arrive at the content provider's servers practically from anywhere in the world. Content providers often restrict access to content based on a user's location or other user information (e.g., age) or charge a different amount based on where a user is located. For example, a newly released movie may be available for viewing in Australia but not in the United States.

Presently, there are no solutions available for effectively monitoring a content network with wide geographic reach and having a large number of content titles available for secure transmission to users. Many existing solutions often are reactive-e.g., a user brings a problem to the content provider's attention or disputes a billing charge, and then the content provider diagnoses the problem. Various currently deployed monitoring solutions that include a monitoring server in a content provider's network often have limited monitoring functions (e.g., response time of a server or throughput to a server, etc.) and tend to fail to detect any problems that can be seen "from outside" the content network, e.g., from a user's vantage point.

The techniques disclosed in the present document provide a trend server outside the content provider network to communicate with the content provider network to build a trend record based on responses received from the content provider network for monitoring certain activity trend or tendency in the content provider network and provide an alert when the content provider network behaves abnormally. The disclosed trend monitor server can be implemented to address one or more of the above-discussed technical limitations and others. In some implementations of the disclosed technology, a trending server may be deployed on the outside of a content provider's network. The trending server may be configured to monitor user interaction with the content provider and check messages going from the content provider to the user for any irregularities. To help with the monitoring of irregularities in a response, the trending server may automatically learn a response trend based on previously received responses. The trending server may either automatically set acceptable values of normal range of parameters in the response or may be programmed by an operator with upper or lower limits to expect. In some implementations, user devices may be configured to communicate with the content network through the trending server. In some disclosed embodiments, new software functionalities and protocols to assist detection of unexpected trends in responses from web services for the purpose of handling unusual behavior are provided.

These, and other, features are disclosed in greater detail below.

FIG. 1 depicts a content network architecture 100 in which a service provider's network 110 and a publically available network such as the Internet 112 are separated by a boundary 104 (e.g., internet address sub-network, firewall, etc.). On the service provider network side, one or more application servers 198 might be inter-connected and configured to perform tasks such as content provisioning, content delivery, billing, user account access, and so on. User devices 104, located on the public network side, are able to communicate with the application server 108 using the above-described wired or wireless networks 106.

During operation, user devices 104 will communicate with the service provider's network 110 to perform various tasks such as requesting content or web pages, interacting with application servers 108 to download or upload information, and so on. During normal operation, certain information in a response from the service provider's network to a request from the user may be expected. For example, when the user accesses a top-level domain name, the home page is expected to be send back to the user. Similarly, in a content provider's network, when a user access a particular movie title, a web page that includes a graphics image, movie metadata (e.g., cast, story line, release year, run time, etc.) and purchase information. Often, the type of information may be predictable, but the actual value of the information may change. For example, for a movie rental web page, it is predictable that a money amount will be displayed for renting the movie, but the actual value may not be known until the web page is served out by an application server 108.

Determining what is a normal response from a web service-oriented system has multiple complexity factors:

1) local dependencies, e.g. work flow between services/databases, hardware, bus/connectivity and so on 2) external factors, e.g. data input feeds, number of concurrent connections, Internet bandwidth, domain name server (DNS), etc.

3) accidental or malicious modification of any of the above leading to unexpected behavior of the system.

Detecting when a normal response is regained also introduces complexity in applications. Sometimes, a no response may also be a normal response. For example, a particular web page, e.g., rental page for a new movie title, may not be available to all user devices 104, e.g., based on geographical location of the user. Therefore, a "title not found" message may be the normal response to a user outside the allowed geographic area, while the movie rental web page would be a normal response to another user in the allowed geographic area.

Using Nagra MediaLive Service Delivery Platform/Content Management System (SDP/CMS) as an example, this system has a complexity where incorrect data entry for a popular video asset might cascade quickly to faults being reported by subscribers calling the customer call center. If the root cause is not immediately evident and later failing to indicate when a fault is resolved leads to service level agreements not being met as well as costs whilst the fault remains, increased churn risk and ultimately unhappy customers.

In another operational scenario, cybersecurity of web-based information systems such as content networks can also be complex. A CMS for example might offer a URL to company press releases. Such a web resource normally contains changes only to article data during business hours. An untested or unmonitored configuration change might lead to resource being moved away, a hacked system might display an entirely different web resource due to tampering with internal data or external factors such as ISP DNS modification (URL redirect), overload of the service (DDoS). Early detection of such compromises is paramount and not always apparent to internal monitoring systems.

To host a monitoring web service adds to the complexity of the overall system as this requires either local connectivity to the system to avoid complexities such as cross origin (CORS) or adds more security holes (hack points) to support it. An internal system might not see outside of its own box or become unavailable outside.

Figure 2:
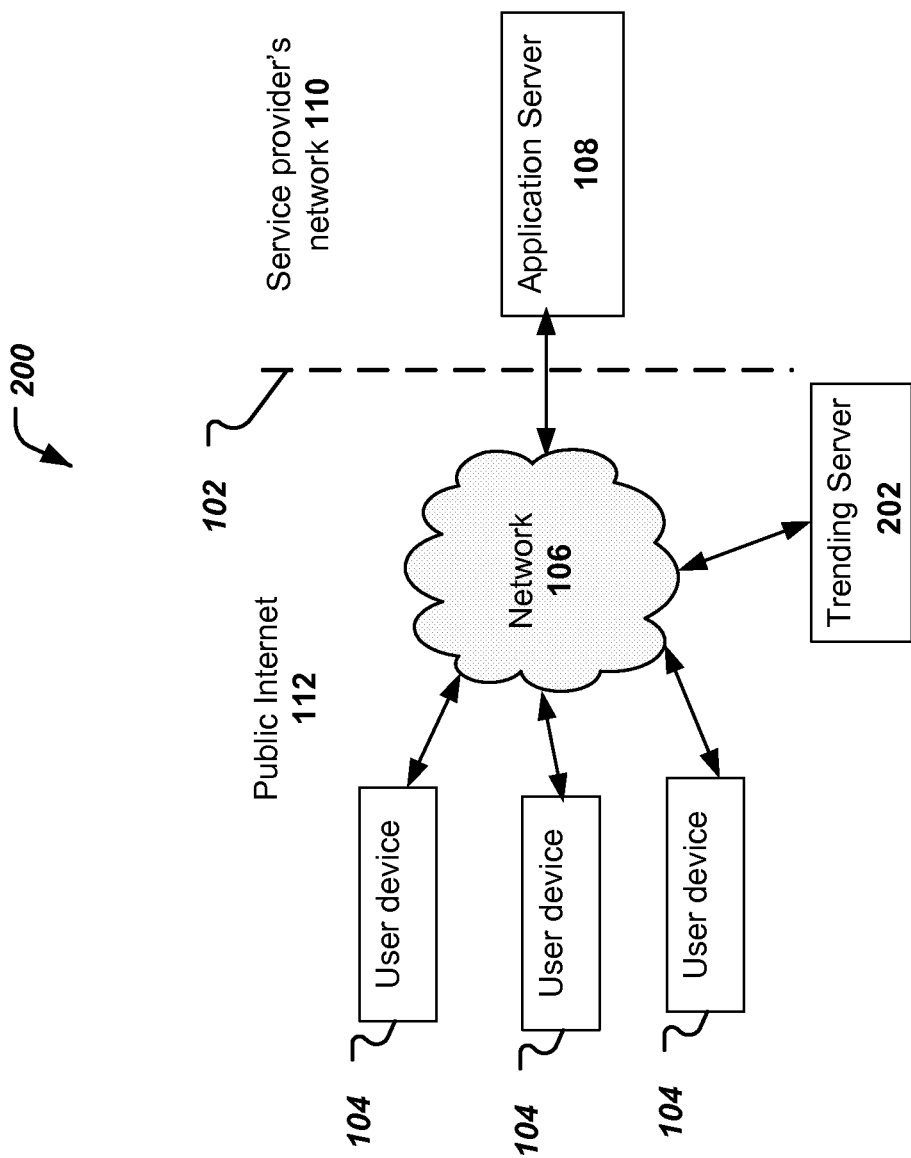
FIG. 2 depicts an example of a content network configuration including a trending server.

FIG. 2 depicts an example of architecture of a content network 200 (in general, a web services network). Compared to the system 100 depicted in FIG. 1, the content network 200 includes a trending server 202. While not explicitly shown in FIG. 2, in some embodiments, multiple trending servers 202 may be deployed spread out over a wide region. Such a trending server 202 is located external to the service provider's network, and also on the same side as the user devices 104. An external location could mean, e.g., in a network not controlled by the service provider or based on IP address of the trending server 202 or on the outside of the firewall 102 that controls access to the service provider's network 110.

As service providers address the need for a seamless multiscreen user experience across devices and networks, many service providers are looking for a fast time-to-market and full control on their costs in a market where requirements are evolving at an increasing pace. Nagra tools and products are designed to meet those and other requirements. For example, Nagra MediaLive Service Platform offers software tools to manage, secure and operate, from a single platform, a wide range of media services across multiple delivery networks (broadcast, managed IP, over-the-top and mobile), devices (set-top boxes, connected TVs, PCs, tablets and phones) and content types. The MediaLive Service Platform unifies server-side functionalities across devices, networks or content types and throughout the entire content lifecycle, from ingestion to consumption and reporting. The MediaLive Service Platform can be accessed over the internet, from across the world, and enforces an operator's conditional access rules regarding which users are allowed to access which content.

The MediaLive Service Platform supports flexible service definition enabling service providers to easily and efficiently monetize their premium entertainment. It manages linear channels and on-demand content delivered across any network to any device. It supports a wide range of business models from subscription, pay-per-view, pay-per-time, "à-la-carte" to event-based purchase models, promotions and addressable advertising.

The MediaLive Service Platform maximizes the device reach of multiscreen services. It provides a sophisticated account and device management capability including personalization and authentication, a unified transaction and content access management including rights and billing event management, domain management, device messaging and many more functionalities. The MediaLive Service Platform makes available an extensive library of interactive applications ranging from extended EPGs, streamed/push/pull/video-on-demand, catch-up TV, start-over, interactive subscription, to multi-store services, cross-device purchases and bookmarking, social networks integration, recommendations and other interactive services.

Figure 3:
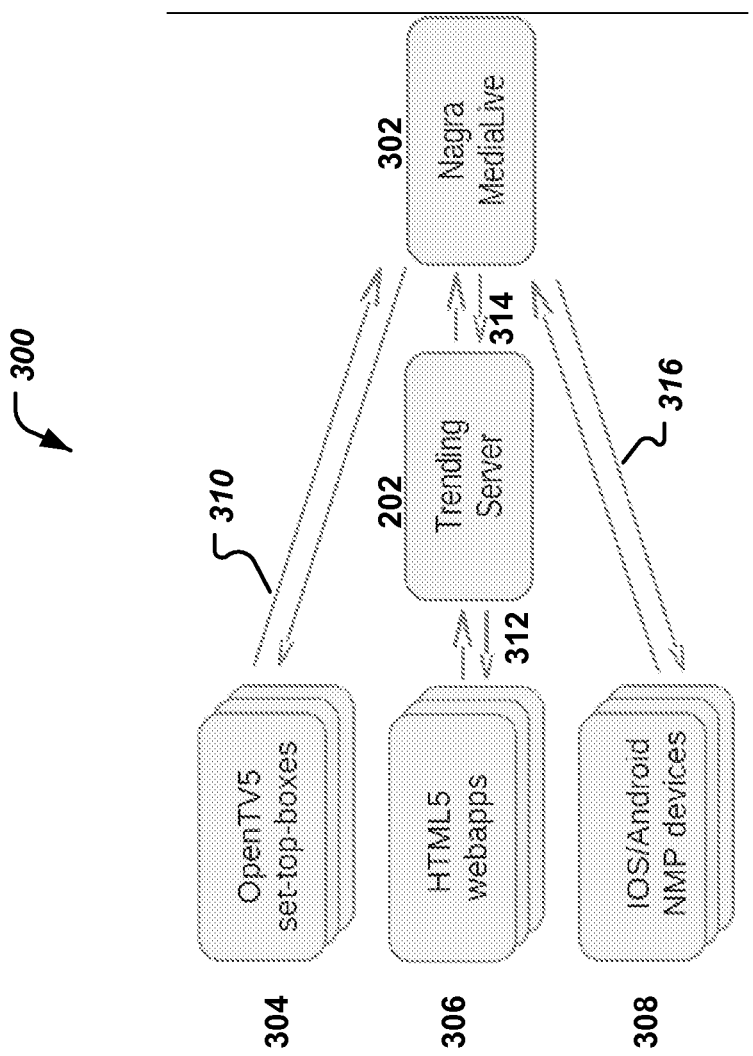
FIG. 3 is a block diagram representation of an example of a content network.

FIG. 3 is a block diagram representation of functional blocks and messages exchanged according to a system configuration 300 suitable for implementing content or application servers based on MediaLive Service Platform or other platforms. A content provider's network 302, which can be implemented by, e.g., previously described Nagra MediaLive enabled network, is accessible by a plurality of user devices 204, 306 and 308. For example, user device 304 may be a digital-set top box such as an OpenTV5 set-top box. The user device 304 may also be embodied in equipment such as a cable-ready television or another consumer device having a return path to be able to communicate with the content provider network 302.

In a given deployment, some set-top boxes may be configured to directly communicate messages 310 with the application server 302 over the service provider's network. These messages 310 may include, e.g., content viewing or purchase requests and download or broadcast of the corresponding content. Some set-top boxes 304 may be configured to communicate with the application serve through a trending server 202. This may be accomplished, e.g., by providing the IP address of the trending server 202 as the destination addresses for the corresponding messages sent out by the set-top box 304. The trending server 202 may in turn monitor requests from set top boxes 304, and receive, process and pass-through responses received from the application server 302 back to the requesting set-top box 304. The processing in the trending server 202 may include determining trends and raising alerts for any deviations from normal responses, as is described in the present document.

The system 300 may include, in some applications, user devices 306 that are configured to run web-based applications, e.g., hypertext markup language version 5 (HTML5) webapps. The user device 306 can communicate with the application server 302 over the connection 312 to the trending server 202, which further communicates with the application server 302 over connection 314 on behalf of the user device 306. In some embodiments the Web Sockets protocol may be used. In one advantageous aspect, Web Sockets allows a connection to remain open, thereby providing ability for the user device 306 to receive any changes to specific web pages monitored via the Web Sockets interface. In some embodiments, an HTML5 application running on the user device 306 could be alerted by a message from the trending server, when updates to web pages that are being monitored over the open Web Sockets connection are considered to be irregular, or outside a range of normal deviation, by the trending server 202.

In some applications, the system 300 may further include user devices 308 equipped with a media player provided by the content service provider. For example, the devices 308 may be wireless or companion devices that users use to access content. In some implementations, the devices 308 may be tablets or mobile phones that run software platforms from Apple or Google (iOS or Android). These user devices 308 may also be configured to operate similar to the user devices 304 (which could be the primary devices for the companion devices 308).

Figure 4:
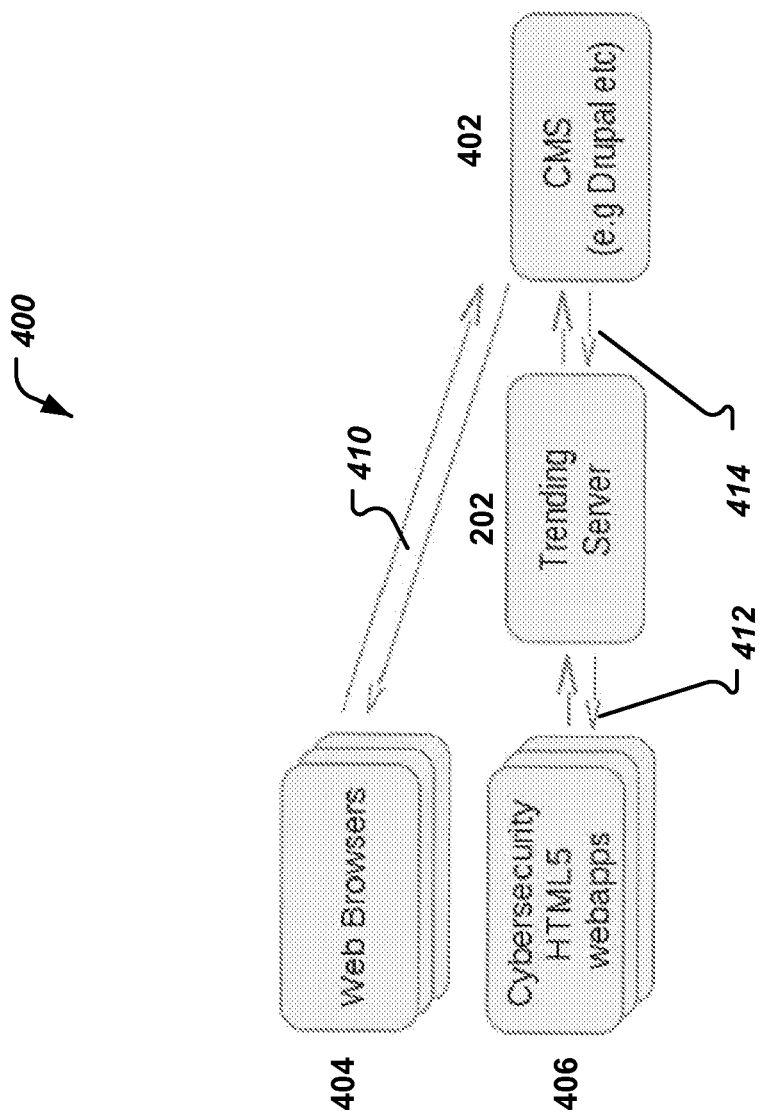
FIG. 4 is a block diagram representation of an example of a web-services network.

FIG. 4 depicts a system configuration 400 in which a web-services network (e.g., a content management system 402) is being accessed by multiple user devices. A user may access a web service offered by the application server 402 using a user device 404 with a web browser or another suitable application or using another mechanism such as the previously described Web Sockets based HTML5 mechanism. For multiple user devices 404 and 406 in a content network, some devices may be configured to communicate with server 402 through an intermediate trending server 202, while other devices 404 and 406 may be configured to communicate directly, i.e., without using the trending server 202 in the communication path. Furthermore, the devices 404 and 406 may be distributed over a wide geographic region and multiple networks (e.g., some devices may be wireless, some may be using cable modem access network, some others may be using a dial-up access network, etc.).

When a user makes a request to the server 402, the user may be provided with a web page, an extensible markup language (XML) document, etc. The trending server 202 may compare the returned web page or XML document for any differences from a trend previously calculated for documents of the same type or documents received from the same request type.

A message returned from the content provider's network may include various types of data. For example, audio, video, text and other multimedia data, metadata related to presentation of other data (e.g., formatting instructions), and so on.

Specific examples of trend calculations in the trending server are described below.

In some implementations, text may be compared against a dictionary of occurrences, frequency of occurrences etc.

Numbers in numerical field in a web page may be compared with a range of previously received numbers, a meaning associated with the numbers and any other input rules provided by a user.

Audio may be checked for file size, encoding parameters and other metadata associated with the audio stream.

Video may be checked for size, encoding parameters (resolution), any embedded messages or links, and so on.

Graphics may be checked for size, placement within a web page, pattern recognized for information in the graphics.

In some implementations, an operator may "seed" a trend by first providing a baseline web page and limits on how values in certain fields may change. The operator may also specify to ignore certain fields from trend checking.

In various applications, trending servers may be distributed in cloud based architecture, with individual trending servers being able to synchronize with each other. One advantage is that a service provider may be providing different content service to users located in different geographical region. For example, a service provider located in Australia may make content available for free to users in Australia, but may be charging viewing fees to users in Europe. Additionally, the content provider may not be making content available to users in Asia.

Figure 5:
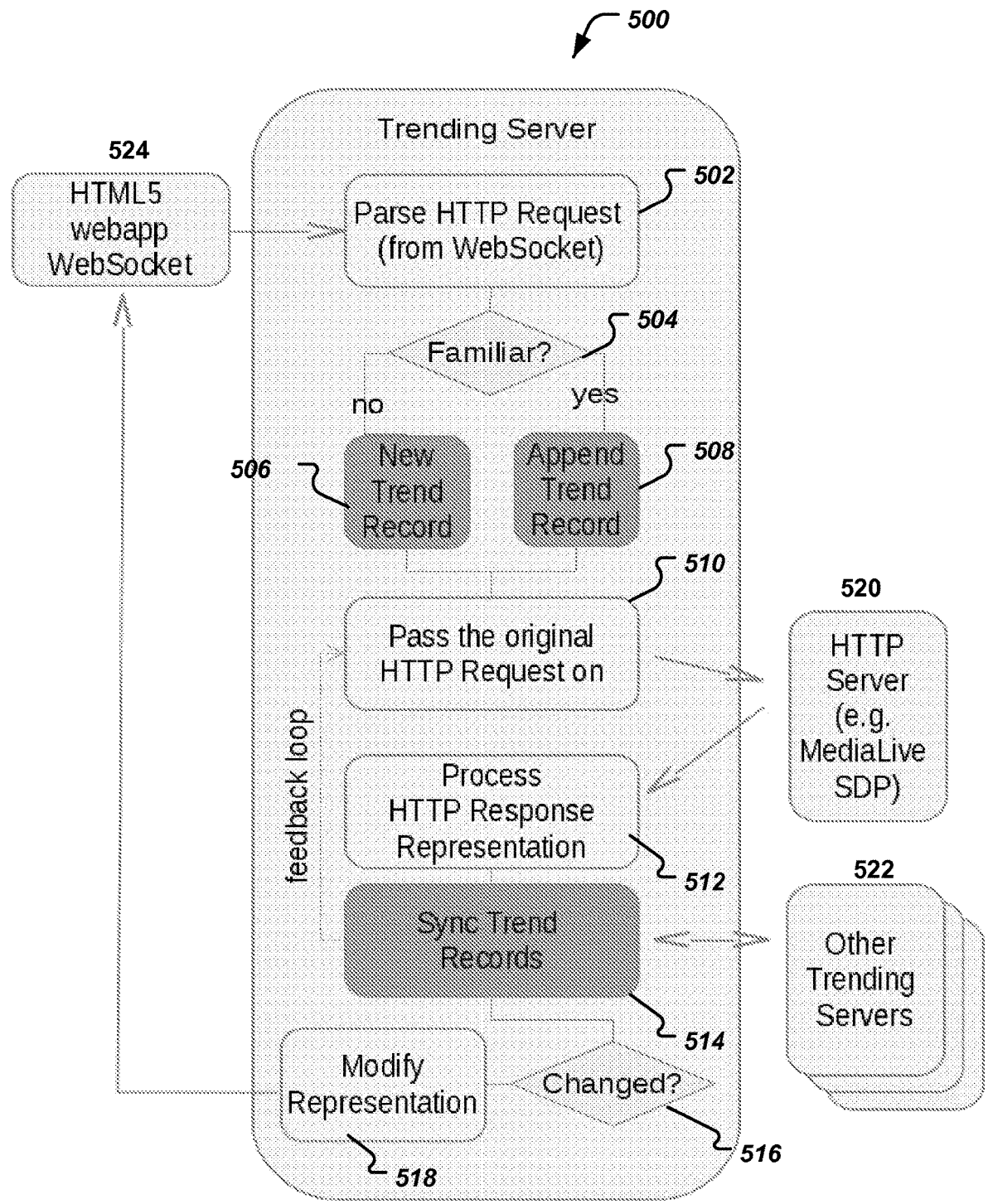
FIG. 5 is a flowchart representation of an example of a process implemented by a trending server.

FIG. 5 is a flowchart representation of a process 500 of operation of a trending server 202. The trending server establishes a WebSocket connection with a user device (not shown in FIG. 5).

At 502, the process 500 parses an HTTP request received over the Web Socket from the user device.

At 504, the process 500 determines whether or not the HTTP request is familiar. For example, the process 500 uses certain fields of the request, or a type of request to determine if a similar request was previously received, either from the same user device or from another user device.

When the process 500 determines that the request is familiar, at 504, the process access a trend record for the type of the request and appends the trend record with parameters and values from the request. In some implementations, the process also assigns a unique identifier value to the request for future tracking and report generation.

If the process 500 determines that the request is not familiar, at 506, a new trend record is established for the request by assigning a new trend record identification and extracting parameters of the request to uniquely identify a type of the request. In some embodiments, the values of the parameters received in the request are used as the initial trend values.

At 510, the process 500 passes on the original HTTP request to an HTTP server 520 such as a MediaLive SDP. In some embodiments, the original HTTP request is modified to the extent of routing information in headers of packets carrying the HTTP request.

At 512, the process 500 receives a response from the HTTP server 520.

At 514, based on the received response, the process 500 synchronizes the trend records for the response. For example, in some embodiments, the trend range may be expanded (or reduced) by including over an average of the range for a parameter value over past N number of responses of that type (N=a suitable integer, e.g., 10 to 50). In some embodiments, the received response may include text and any new words or messages in the received text may be added to the trend record for that type of message. In some embodiments, the received response may include graphics and the process 500 may update the trend record to include characteristics of the graphics (e.g., placement on a web page, resolution, color depth, size in bytes, etc.).

In some embodiments, the process 500 may further sync the received response with other trending servers 522, which may be spread out over a wide geography (e.g., other states, nations or continents).

In general, responses received may include text, numbers, and graphics and control commands. It may be unlikely that two responses received at two different times are identically in every bit of the response. Based on the syncing in 514, the process 500 determines changes in the currently received response from the trend record. For changes that seem "normal" or "expected," the process 500, at 518, may modify the representation of the trend record. For example, in one response message, a web page may include a "last updated" field that includes a date. In a subsequently received response message, the web page may include the "last updated" field by may include data and time. The process 500 may thus modify the expected representation for the web page to include a "time" field in addition to the "date" field.

At 524, the process 500 conveys the results of 518 to an HTML5 webapp.

Figure 6:
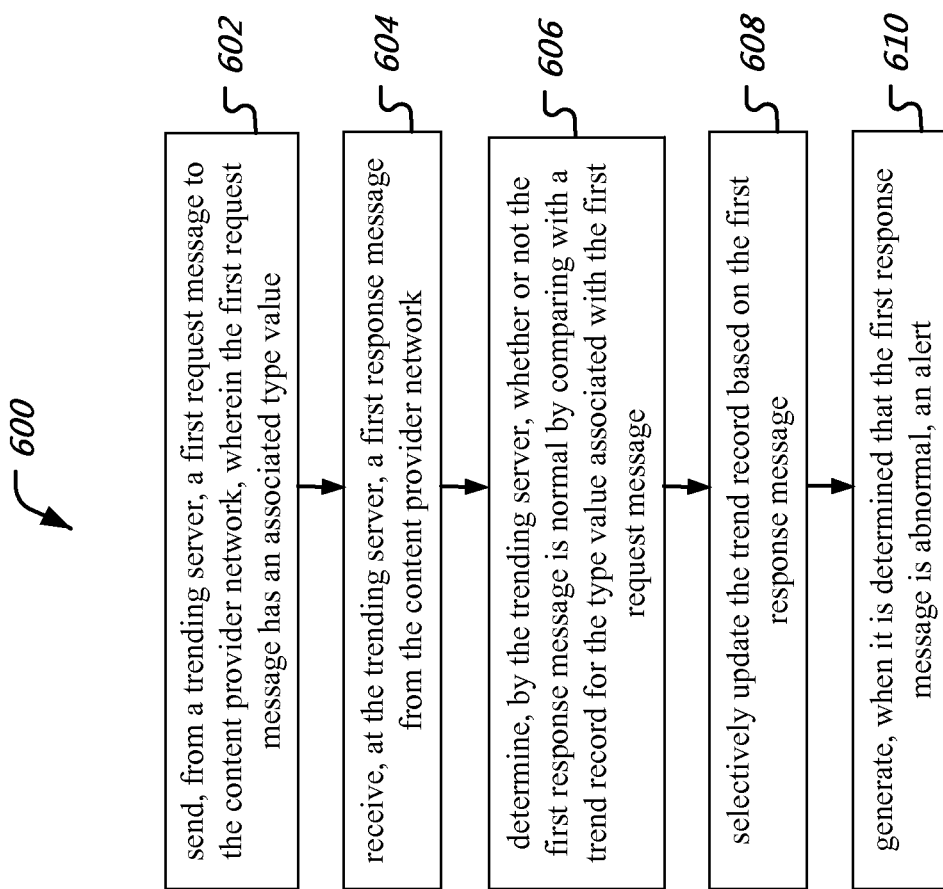
FIG. 6 is a flowchart representation of an example of a process of monitoring a content network.

FIG. 6 is a flowchart representation of a computer-implemented process 600 to monitor status of a content provider network.

At 602, the process 600 sends, from a trending server, a first request message to the content provider network, wherein the first request message has an associated type value. In some embodiments, the type value may be derived based on a URL included in the request. In some embodiments, the entire URL may correspond to the type.

At 604, the process 600 receives, at the trending server, a first response message from the content provider network. As previously discussed, the message may be formatted as a document, e.g., an XML document, or a web page (e.g., HTML script) and so on.

At 606, the process 600 determines, by the trending server, whether or not the first response message is normal by comparing with a trend record for the type value associated with the first request message. Various possible processing operations performed by a trending server in determining whether a response is normal or not (i.e., regular or irregular) have been previously disclosed.

At 608, the process 600 selectively updates the trend record based on the first response message. In some embodiments, the trend record may be updated only when it is determined that the first response message is normal. Acceptable values of certain fields may be appended or averaged to include the most recently received. For example, in some embodiments, previously received values for a certain integer field may be in the range between 1 and 5. The trending server may therefore consider the allowable values to be the set (1, 2, 3, 4, and 5). When a message is received that is determined to be normal, but contains the value "6" in the field, and then the trending server may update the range of allowable values to (1, 2, 3, 4, 5, and 6).

At 610, the process 600 generates, when it is determined that the first response message is abnormal, an alert. For example, if the process 600 determines that a "movie rental cost" field in a web page, which is supposed to have a normal range between $0.99 to $7.99 now, has a value $0 or $100, then the process 600 raises an alert. The alert may be in the form of an audio/visual cue generated for the user device receiving the response. The alert may be a message that is displayed (or sounded) to an operator of the trending server. The alert may be a message that is logged in an alert log of the trending server.

Figure 7:
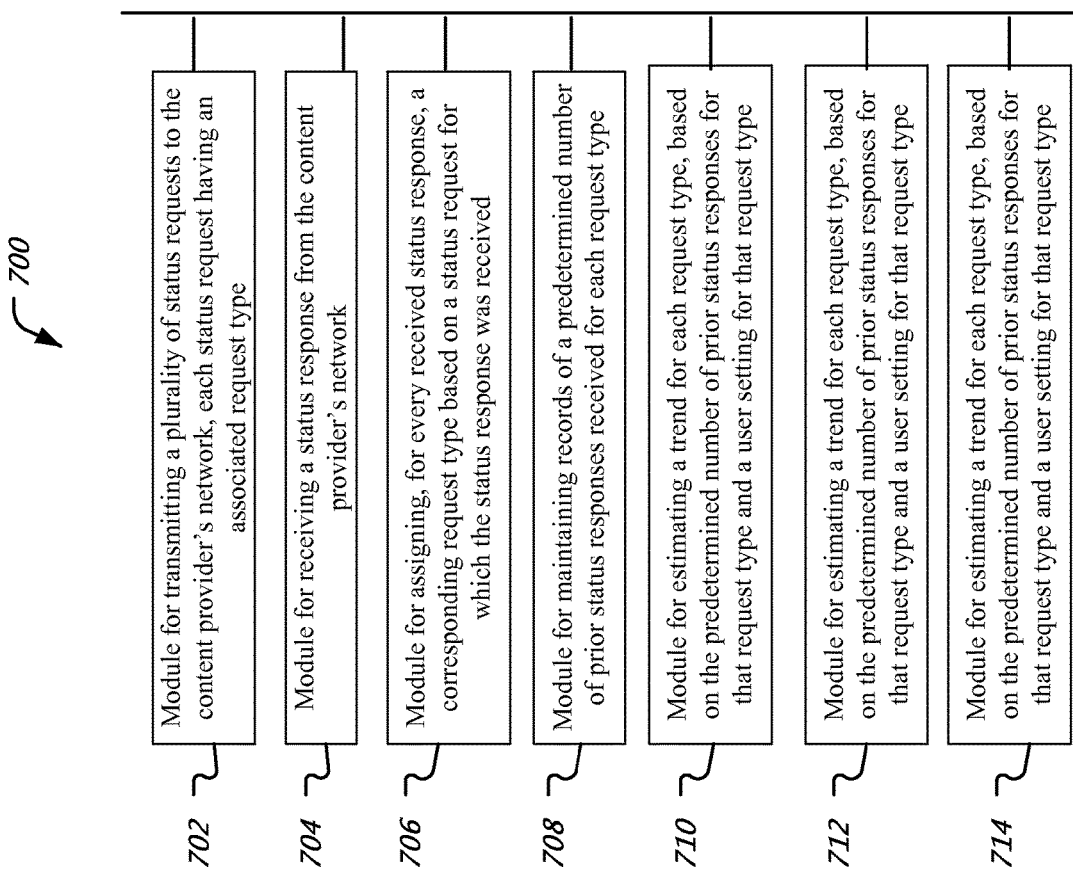
FIG. 7 is a block diagram representation of an example of a content network monitoring apparatus.

FIG. 7 is a block diagram representation of an apparatus 700 for monitoring operation of a content provider's network.

The module 702 a status request transmission module that transmits a plurality of status requests to the content provider's network, each status request having an associated request type. In some embodiments, the status requests may be formatted as stateless queries such as web messages using the REST protocol (representational state transfer protocol). In some embodiments, the status requests may be generated autonomously by the trending serve, i.e., without having received a previous request from a user device.

The module 704 is for receiving a status response from the content provider's network. As previously discussed, a status response may use REST protocol, may be a web page or an XML document, and may include audio, video or other embedded information.

The module 706 is for assigning, for every received status response, a corresponding request type based on a status request for which the status response was received. Several techniques for assigning request types (e.g., based on URL fields) have been disclosed in the present document.

The module 708 is for maintaining records of a predetermined number of prior status responses received for each request type.

The module 710 is for estimating a trend for each request type, based on the predetermined number of prior status responses for that request type and a user setting for that request type. For example, in some implementations, a trend may be based on 10 previously received responses for the same message type, before receiving the most recent response message. In some implementations, a trend may be based on all previously received responses of a given type. In some implementations, a trend may be based on a number of previously received responses at a given time (e.g., on Mondays or in mornings, and so on).

The module 712 is for checking, for each received status response, whether or not the received status response is within the trend for the corresponding request type. As previously discussed, trend checking may be performed differently for different data types and make include range checking, comparison, and other processing.

The module 714 is for issuing an alert when the received status response is not within the trend for the corresponding request type. Techniques for issuing alerts have been discussed previously in this document.

Figure 8:
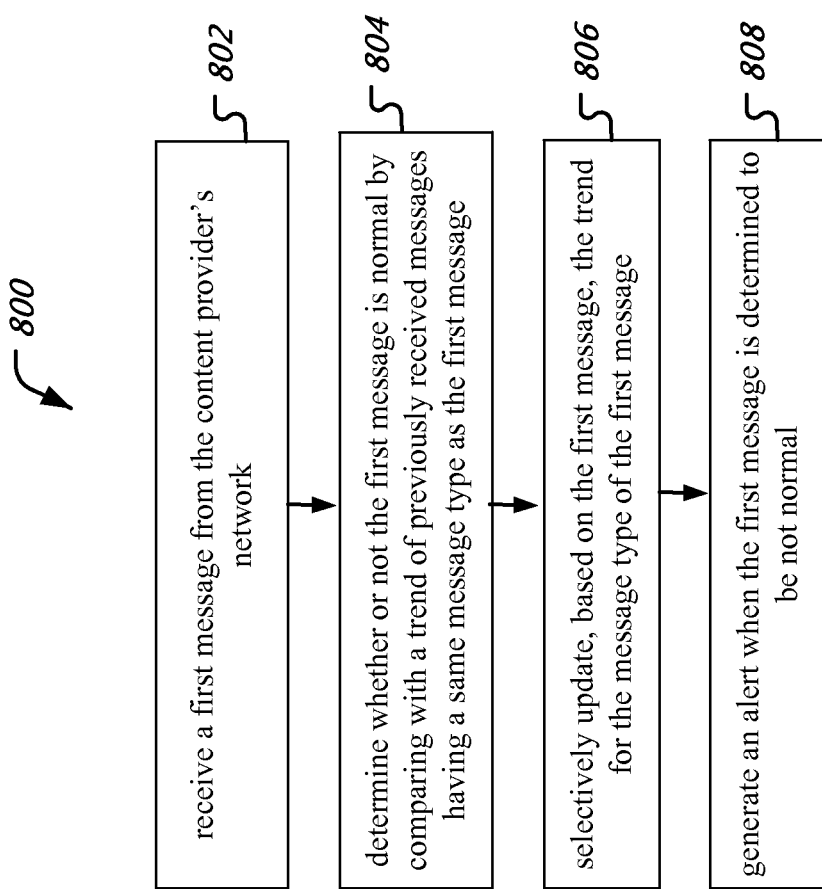
FIG. 8 is a flowchart representation of an example of a process of monitoring a content network.

FIG. 8 is a flowchart representation of a process 800 for monitoring operation of a content provider's network.

At 802, the process 800 receives a first message from the content provider's network. In some implementations, the first message may be a message that notifies the process 800 of a change on a web server via a Web Socket connection open between a trending server and the content provider's network.

At 804, the process 800 determines whether the first message is normal by comparing with a trend of previously received messages having a same message type as the first message.

At 806, the process 800 selectively updates, based on the first message, the trend for the message type of the first message. In some implementations, the trend updating is performed only when it is determined that the received message is normal. In some implementations, the trend updating may be performed regardless of whether the received message is normal or not.

At 808, the process 800 generates an alert when the first message is determined to be not normal. Various embodiments for generating the alert have been previously disclosed in this document.

In some implementation, multiple trending servers may be implemented as follows. A global trending server may act as a coordinator that coordinates activities of multiple trending servers in a trending server cloud geographically distributed over a region. The global trending server may communicate with the other trending servers and provide information about which web pages to monitor for trends. Periodically, each trending server requests and receives a web page being monitored. The trending server communicates the results of its query to the global trending server. For example, the trending server may either send outcome of its determination of whether or not the web page received was normal. Alternatively, the trending server may also pass on the received web page to the global trending server and the global trending server makes a determination of whether or not the received web page was normal.

With reference to FIG. 9 to FIG. 16, as a non-limiting example, a deployment in Sydney may monitor the status of a content network. A user device 902, an iPad with an HTML5 capable application, may be configured to monitor certain web pages, represented by their uniform resource identifier (URI).

Figure 9:
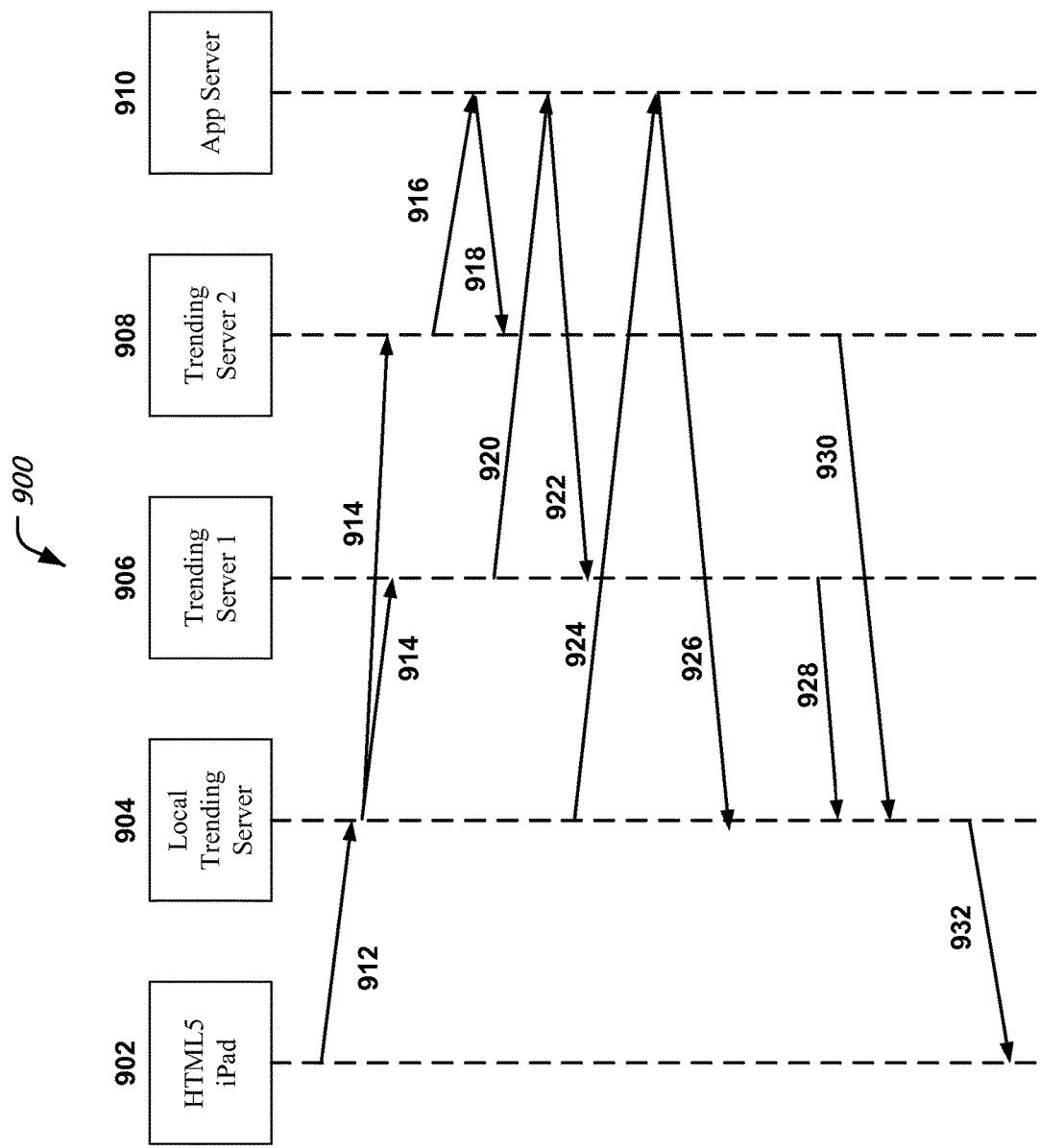
FIG. 9 depicts examples of signals exchanged in a cloud based trending monitoring system.

FIG. 9 shows an example of a web page that may be monitored in a system that has multiple trending servers. In this example, the web page is formatted as an XML file that provides information about a movie available for rent and includes a number of fields and their corresponding description metadata.

A monitoring app running on the user device 902 (e.g., a tablet) may direct a local trending server 904, e.g., a server located in Sydney for a user in Sydney, to monitor a certain web page by providing a URI to the web page (912).

The local Trending Server 904 parses the HTTP Request and locates or creates a new Trending Record from the Trending database. The Sydney Trending Server 904 then triggers the global Trending Server cloud, comprising for example Trending Server 1 (906) and Trending Server 2 (908), to generate an HTTP Request to the URI data passed to it (914).

Each Trending Server in the cloud, on a specified schedule, requests status of the web page based on the URI (messages 916, 920 and 924). In some embodiments, the request times of the messages 916, 920, 924 may be synchronized to get multiple snapshots of the webpage from different locations at the same time. In some embodiments, each Trending Server may sends its own HTTP request asynchronously from other Trending Servers.

An App server in the content network, e.g., Nagra MediaLive SDP, handles the HTTP Request and passes Response back to each Trending Server (responses 918, 922 and 926, respectively).

Each Trending Server 906, 908 in the global trending server cloud then compares the received response and generates a trending report 928, 930, which is then forwarded to the local Trending Server 904. The local Trending Server 904 generates its own report of whether the received response was normal or not.

Each Trending Server updates its Trending Record selectively based on the received response.

The local Trending Server 904 (Sydney Trending Server) processes the trending record updates from the trending cloud.

Optionally the web page update request can be made again after a set time by triggering the same request again and determining a change in the Trending Record.

If the message 912 is the first request from the user device 902, or an unexpected change is detected, the listening clients are updated via the WebSocket 932 by reporting the changes.

In some embodiments, the local trending server sends a first type of alert message (e.g., a distinct audio tone or visual cue on the user device) to highlight unexpected change from Sydney, but not from elsewhere. In some embodiments, the local trending server sends a second type of alert message, with its own audio-visual cues, to indicate detection of abnormality from another trending server in the cloud. The user can further investigate the abnormality based on the detail provided in the report 932.

FIG. 10 depicts an example web page monitored by the trending server 202. This web page includes a number of fields and the corresponding values (alphanumeric strings) that are used to provide information for a movie available for rental from an application server in the service provider's network.

Figure 11:
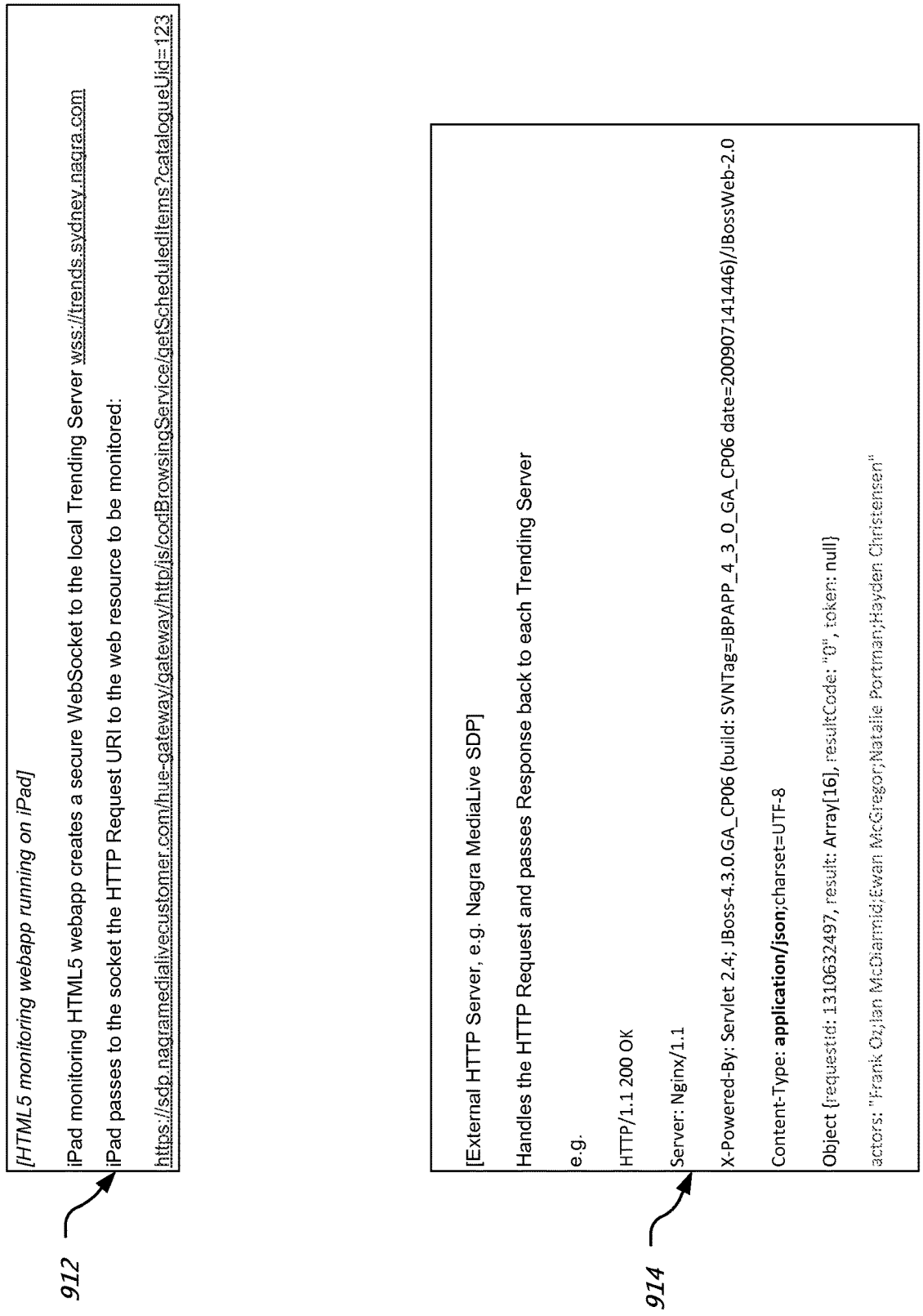

FIG. 11 depicts examples of some content of messages 912 and 914.

FIG. 12 depicts examples of some content of messages 928, 930 and 931. Each Trending Server may identify its identity using a "trendingserver" parameter. Furthermore, trending servers may annotate the observed parameter values with trends seen for the values and explicitly list any deviations from normal.

FIG. 13 depicts an example of content of message 932. In this example, the local trending server indicates that a web page appears to be normal from its vantage point, but some other trending server in the trending cloud has detected a change in the web page. For example, a web page being monitored by a trending server may have been hacked using a DNS exploit at an internet service provider's caching server, but the original web page (e.g., at Nagra CMS) may still be intact. In such a case, FIG. 13 may represent a message from a trending server monitoring the CMS (and not seeing any irregular changes to the web page) which becomes aware through syncing with the trending server cloud of a trend abnormality noticed by a trending server that is receiving its webpage status responses (e.g., REST responses) from the ISP of the hacked web page.

FIG. 14 may represent a trend abnormality noticed by a trending server that is receiving its webpage status responses (e.g., REST responses) from the ISP of the hacked web page and therefore notices an irregular change in the monitored web page.

FIG. 15 depicts another example of message 932 in which the user is alerted with changes in certain fields of the web page monitored.

It will be appreciated that techniques for monitoring normal operation of a web services system such as a content service provider's network are disclosed. In some embodiments, the network is monitored from multiple locations in different geographic areas. In some embodiments, a report is generated for the current status of a web page by comparing with a previous trend of the web page and alerting a user of any unexpected or abnormal changes in the web page. The monitoring can be performed remotely from a thin user device, such as from an application running on a mobile device.

It will further be appreciated that several techniques are disclosed for monitoring trends in changes to a web page by monitoring different data types, e.g., data, audio, video, etc., in a variety of ways.

The disclosed and other embodiments, modules and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method of monitoring communications, the method comprising:
   receiving, by a first server, a message associated with a second server, the message being associated with a type value;
   receiving, by the first server, a response message generated based on the message, the response message including data associated with the message and a parameter value associated with an attribute of the data;
   determining, by the first server, that the response message is acceptable at least in part by determining that the parameter value of the response message meets a threshold defined in one or more activity records, the one or more activity records being associated with the type value associated with the message;
   updating an activity record of the one or more activity records based on the response message and based on the parameter value of the response message meeting the threshold; and
   providing, by the first server, the updated activity record for use by the second server.

2. The computer-implemented method of claim 1, wherein the first server and the second server are part of a network of servers.

3. The computer-implemented method of claim 1, wherein the first server and the second server are geographically separated.

4. The computer-implemented method of claim 1, wherein the message is a first message, and the response message is a first response message, and wherein the method further comprises:
   receiving, by the first server, a second message associated with the second server, the second message being associated with the type value;
   receiving, by the first server, a second response message generated based on the second message; and
   determining, by the first server, that a parameter value of the second response message does not meet the threshold defined in the one or more activity records, wherein an alert is generated based on the parameter value of the second response message not meeting the threshold.

5. The computer-implemented method of claim 1, wherein the activity record is generated based on one or more messages associated with the type value received before the message.

6. The computer-implemented method of claim 1, wherein the response message is generated by a computer system, and wherein receiving the response message includes receiving the response message from the computer system.

7. The computer-implemented method of claim 6, wherein the computer system includes an application server.

8. The computer-Implemented method of claim 1, wherein the response message is a first response message, wherein the data is first data, wherein the parameter value is a first parameter value, wherein the attribute is a first attribute, and wherein the method further comprises:
   receiving, by the first server, a second response message including second data associated with a second message and a second parameter value associated with a second attribute of the second data;
   determining, by the first server, that the second parameter value of the second response message meets the threshold defined in the one or more activity records; and
   updating the activity record of the one or more activity records based on the second response message and based on the second parameter value of the response message meeting the threshold.

9. The computer-implemented method of claim 1, wherein the response message includes a link to a malicious resource.

10. The computer-implemented method of claim 1, wherein the parameter value includes a numerical amount associated with a transaction.

11. A system for monitoring communications, the system comprising:
   a first server engine; and
   a second server engine configured for communication with a service provider network, wherein at least one of the first server engine and the second server engine are configured to:
   monitor communication between a computing device and the service provider network, the communication being associated with a type value;
   identify a response message to the computing device generated based on the monitored communication, the response message including data associated with the monitored communication, the data having a parameter value defining a characteristic of the data;

determine that the response message is acceptable at least in part by determining that the parameter value of the response message is in a range of values for one or more activity records, the range of values being defined based at least on the type value associated with the monitored communication between the computing device and the service provider network; and update an activity record of the one or more activity records based on the response message including the parameter value that is in the range of values for the one or more activity records.

12. The system of claim 11, wherein the first server engine and the second server are part of a network of servers.

13. The system of claim 11, wherein the first server and the second server are geographically separated.

14. The system of claim 11, wherein the first server is not configured for communication with the service provider network.

15. The system of claim 11, wherein the first server and the second server are geographically separated, and wherein at least one of the first server and the second server monitors the communication between the computing device and the service provider network without receiving any of the communications between the computing device and the service provider network.

16. The system of claim 11, wherein the response message is received from one or more servers located in the service provider network and is under management of a service provider of the service provider network.

17. The system of claim 11, wherein the second server is configured to: provide the updated activity record to the first server.

18. A first server for monitoring communications, comprising:

one or more processors; and a memory accessible to the one or more processors and storing instructions which, upon execution by the one or more processors, causes the one or more processors to perform operations comprising:

receive a message associated with a second server, the message being associated with a type value;

receive a response message generated based on the message, the response message including data associated with the message and a parameter value associated with an attribute of the data;

determine that the response message is acceptable at least in part by determining that the parameter value of the response message meets a threshold defined in one or more activity records, the one or more activity records being associated with the type value associated with the message;

update an activity record of the one or more activity records based on the response message and based on the parameter value of the response message meeting the threshold; and provide the updated activity record for use by the second server.

19. The first server of claim 18, wherein the first server and the second server are part of a network of servers.

20. The first server of claim 18, wherein the response message is generated by an application server, and wherein receiving the response message includes receiving the response message from the application server.

* * * * *